Patented Dec. 11, 1934

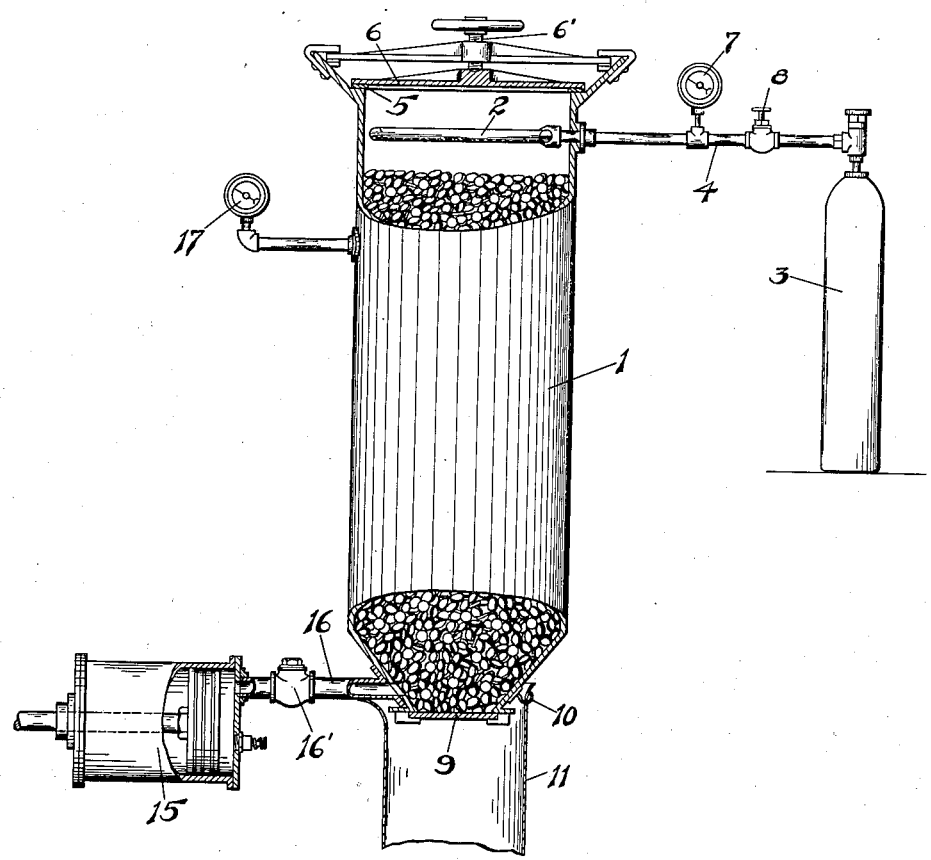

1,983,648

UNITED STATES PATENT OFFICE 1,983,648

METHOD OF GAS TREATING ARTICLES

Albin H. Warth, Baltimore, Md., assignor to Crown Cork & Seal Company, Inc., Baltimore, Md., a corporation of Maryland Application January 4, 1930, Serial No. 418,513

2 Claims. (Cl. 167—3)

This invention relates to a process and apparatus for treating composition cork.

In my Patent No. 1,524,494 issued January 27, 1925, there is disclosed a process of treating composition cork, such as cork disks, to destroy or prevent the development of living organisms such as mold spores, bacteria, fungus growths, yeasts, as insect larvæ, etc. The process of said patent involves diffusing through the cork a gas which is toxic to the living organisms and non-injurious to the cork. Sulphur dioxide is such a toxic gas and other gases such as hydrocyanic acid gas, carbonic acid gas, chlorine, etc. are likewise applicable in the process. The toxic gas is thoroughly diffused through the cork and displaces the air in the pores thereof until the cork is sufficiently saturated to effect the purpose of destroying the living organisms.

In the practise of the invention according to the process of said patent, the corks are introduced into a closed chamber which may conveniently be provided by a container and the toxic gas allowed to enter the chamber at a measured rate and until the corks have been thoroughly saturated by the gas which displaces wholly or largely the air within the cork pores. As pointed out in the patent referred to, the gas treatment should be so conducted that the cork will not be over-saturated with the gas for a given product and hence the gas should be admitted at a definite measured rate which may be determined by observation and manipulation of the instruments employed, as explained in my Patent No. 1,610,339 issued December 14, 1926. At the end of the saturation period, the gas is shut off and the gas-saturated corks withdrawn from the container. They are now ready to be used, and, by reason of the presence of the toxic gas in the pores and the absence of air necessary to support life, living organisms cannot exist or develop in the corks.

It is an object of the present invention to provide a process of treating composition cork along the lines of the process referred to such that the cost of the treatment is materially reduced by reducing the period of time required.

It is a further object of the invention to provide an apparatus for carrying out the new process.

With these general objects in view the invention consists in the process, features, combinations, details of construction and arrangements of parts which will first be described in connection with the accompanying drawing and then more particularly pointed out.

In the drawing, the single figure is a view partly in vertical section and largely diagrammatic of apparatus constructed in accordance with the invention.

According to the process of the present invention, the articles to be treated, for example, composition cork disks for bottle caps, are placed in a closed chamber. Air is withdrawn from the chamber. Then there is introduced into the chamber, under pressure, a gas that is toxic to living organisms and non-injurious to the cork, that is, such a gas as is referred to in said patents.

In carrying out the invention to what is now considered the best advantage, the air is exhausted to a predetermined degree. Then the gas is admitted until the chamber pressure builds up again to its initial value. It has been found that a suitable degree of vacuum or minus pressure is 15–20 inches of mercury. The action of the gas on the cork is substantially as described in the patents referred to. But with the process here described the treatment may be carried out in a matter of minutes instead of hours, as heretofore.

Referring to the drawing, the apparatus shown as an example comprises a container 1 providing a closed chamber in which the cork members to be gas-treated are placed. The toxic gas employed is admitted to the chamber through a distributor 2 located near the upper end of the container. This distributor consists of an annular pipe having perforations through which the gas escapes. The toxic gas employed may be obtained from a suitable source. In the embodiment shown, this source is indicated as an ordinary gas cylinder 3 which contains the gas under pressure. Connecting the cylinder 3 with the distributor 2 is a pipe 4 having a control valve 8 and a gauge 7.

To seal the chamber, the upper end of the container is provided with a gasket 5, and a cover 6, the cover being held down on the gasket by a screw 6'. After treatment, the cork disks may be discharged from the container, as through an opening in the bottom closed by a slide 9. The container is shown as provided with hooks 10 on which a bag as 11, or any other suitable receptacle may be supported.

While the air may be exhausted in various ways, as here shown as an example, a suction pump 15 is connected with the bottom of the chamber by a pipe 16 having a check valve 16'. Also connected to the chamber, to indicate chamber pressure, is a pressure gauge or manometer 17.

In operation, the corks to be treated are placed in the chamber and the latter is sealed by its lid or cover 6. Pump 15 is run until the chamber is at the desired degree of vacuum, as indicated by gauge 17. Then, the pump being stopped, valve 8 is opened to admit gas from tank 3. The gas is allowed to flow until gauge 17 indicates that the chamber is again at initial pressure. Valve 8 is then closed. Thereafter the corks may be removed through the bottom by opening slide 9.

What is claimed is:

1. The process of treating composition cork articles to destroy living organisms therein without injuring the cork which comprises placing said articles in a closed chamber, exhausting air from said chamber to a predetermined degree of vacuum less than that at which the cork cells collapse, and then admitting to the chamber, under pressure, gas toxic to living organisms and non-injurious to the cork, the gas flow being diluted by the residual air in said closed chamber, and discontinuing the admission of said gas to said chamber when the chamber pressure is substantially at its initial value.

2. The process of treating composition cork articles to destroy living organisms therein without injuring the cork which comprises placing said articles in a closed chamber, exhausting air from said chamber until the reduced pressure therein is measurable by 15–20 inches of mercury, then admitting to said chamber, under pressure, gas toxic to living organisms and non-injurious to the cork, thereby diluting said gas by the residual air in said chamber, and discontinuing the admission of gas to said chamber when the pressure therein reaches substantially its initial value.

ALBIN H. WARTH.